United States Patent
Ikeda et al.

(10) Patent No.: US 8,550,347 B2
(45) Date of Patent: Oct. 8, 2013

(54) INFORMATION READING DEVICE

(75) Inventors: Masahiro Ikeda, Nagano (JP); Keiji Ohta, Nagano (JP)

(73) Assignee: Nidec Sankyo Corporation (JP)

(*) Notice: Subject to any disclaimer, the term of this patent is extended or adjusted under 35 U.S.C. 154(b) by 0 days.

(21) Appl. No.: 13/266,633

(22) PCT Filed: Mar. 29, 2010

(86) PCT No.: PCT/JP2010/002258
§ 371 (c)(1),
(2), (4) Date: Nov. 16, 2011

(87) PCT Pub. No.: WO2010/125741
PCT Pub. Date: Nov. 4, 2010

(65) Prior Publication Data
US 2012/0228380 A1 Sep. 13, 2012

(30) Foreign Application Priority Data

Apr. 30, 2009 (JP) ................. 2009-110270

(51) Int. Cl.
G06K 7/08 (2006.01)
G06K 7/00 (2006.01)

(52) U.S. Cl.
USPC ........................... 235/449; 235/440

(58) Field of Classification Search
USPC ................................ 235/440, 441, 449
See application file for complete search history.

(56) References Cited

FOREIGN PATENT DOCUMENTS

| JP | 7-244709 A | 9/1995 |
|----|------------|--------|
| JP | 11-16310 A | 1/1999 |
| JP | 2002-342751 A | 11/2002 |
| JP | 2005-182302 A | 7/2005 |
| JP | 2005-196375 A | 7/2005 |

OTHER PUBLICATIONS

Machine translation of Yamanaka (JP 11016310 A) at http://dossier1.ipdl.inpit.go.jp, done Nov. 27, 2012.*
International Search Report for International application No. PCT/JP2010/002258, completed Jun. 22, 2010, mailed Jul. 6, 2010.

* cited by examiner

Primary Examiner — Daniel Hess
(74) Attorney, Agent, or Firm — Cantor Colburn LLP

(57) ABSTRACT

Disclosed is an information reader wherein the degree of freedom of design can be increased, and magnetic information recorded on an information recording medium can be properly read. Specifically, the information reader comprises a medium passage through which the information recording medium having the magnetic information recorded passes, a magnetic head which is brought into contact with the information recording medium passing through the medium passage and reads the magnetic information recorded on the information recording medium, guide sections for guiding the information recording medium so that a force acts on the information recording medium and the magnetic head to push each other when the information recording medium and the magnetic head are brought into contact with each other, and a biasing mechanism which biases the magnetic head in the direction in which the information recording medium and the magnetic head are brought into contact with each other. The guide sections are not arranged at a position facing a magnetic gap formed at the end of the magnetic head, and are arranged closer to the upstream side than the magnetic gap in the direction in which the information recording medium passes through.

33 Claims, 9 Drawing Sheets

Fig. 7
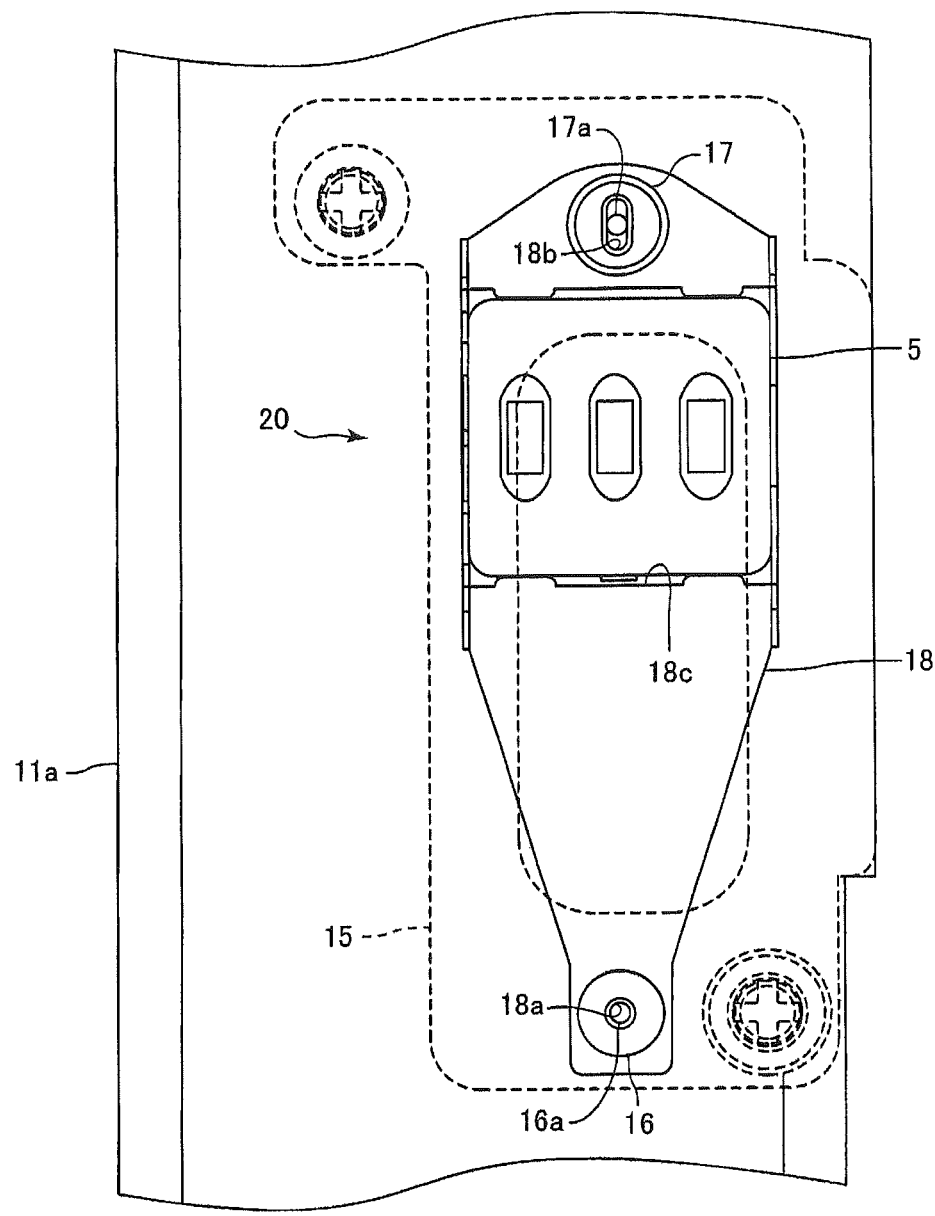
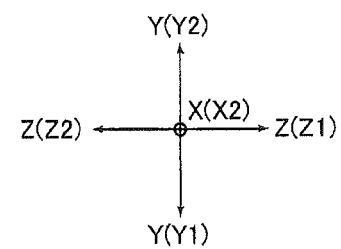

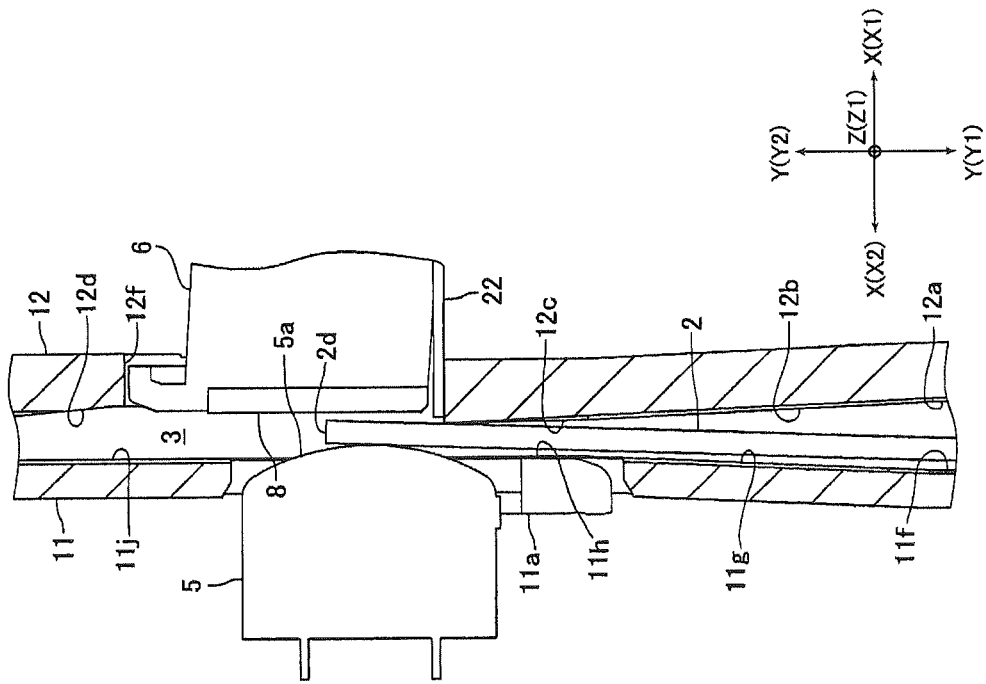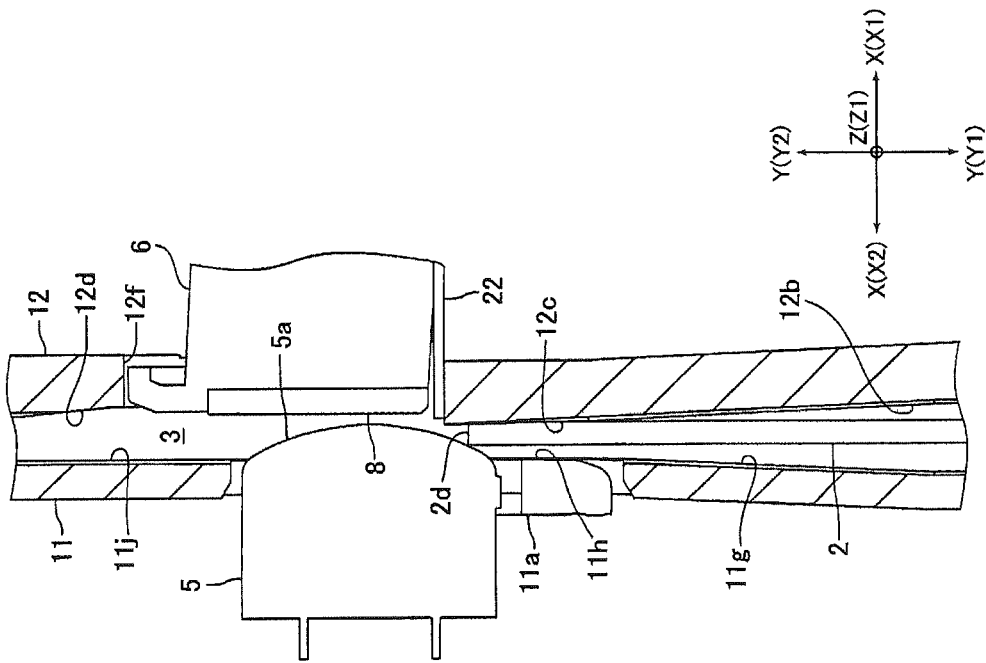

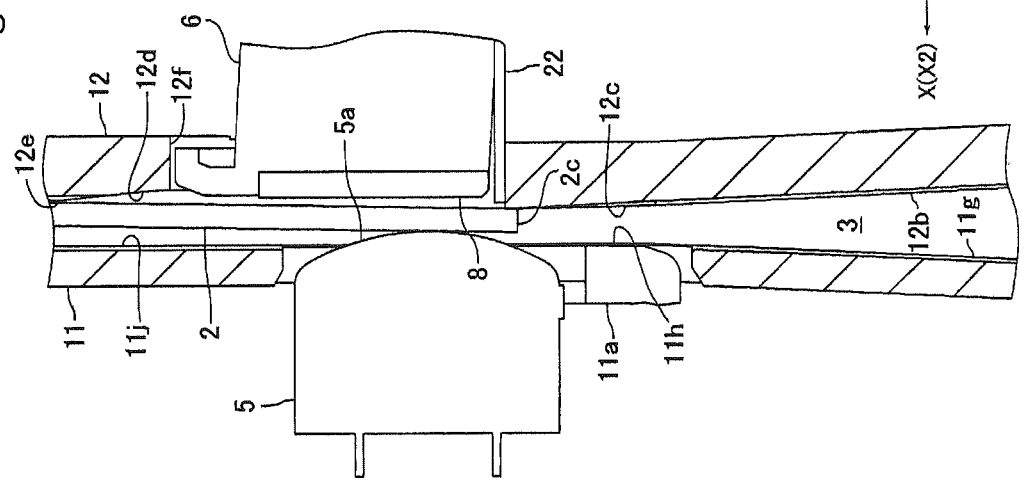
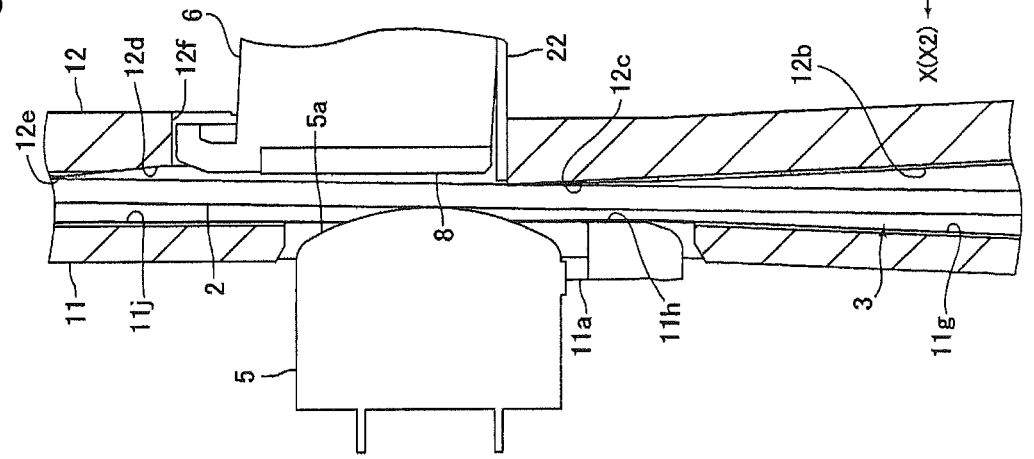

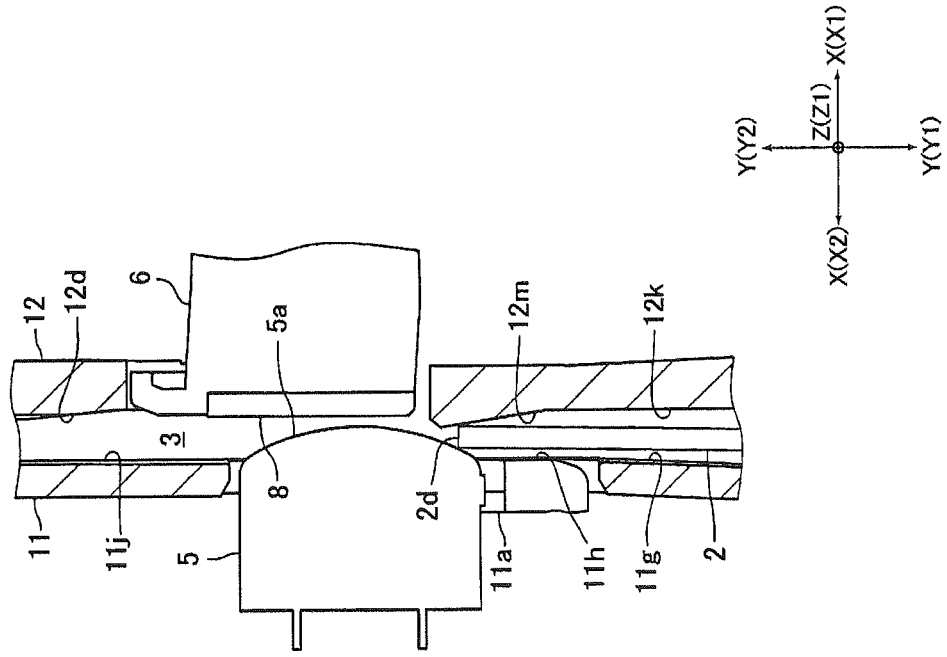
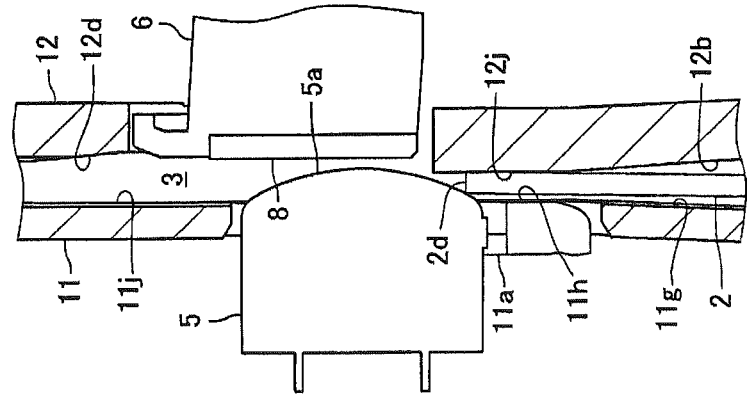

INFORMATION READING DEVICE

CROSS REFERENCE TO RELATED APPLICATIONS

This is a U.S. national stage of application No. PCT/JP2010/002258, filed on Mar. 29, 2010. Priority under 35 U.S.C. §119(a) and 35 U.S.C. §365(b) is claimed from Japanese Application No. 2009-110270, filed Apr. 30, 2009, the disclosure of which is also incorporated herein by reference.

TECHNICAL FIELD

The present invention relates to an information reading device for reading magnetic information which is recorded on an information recording medium.

BACKGROUND

Conventionally, a manual type card reader has been utilized in which magnetic information recorded on a card is read while the card is moved manually. A so-called swipe type card reader has been known as this type of a manual type card reader in which magnetic information of a card is read while the card is moved along a groove-shaped card passage that is formed shorter than a width of card in a short widthwise direction (see, for example, Patent Literature 1).

In a manual type card reader which is described in Patent Literature 1, a magnetic head is disposed so as to face a card passage. Further, in this manual type card reader, a closing part is formed on one end side of a card passage and an opening part is formed on the other end side of the card passage, and reading of magnetic information of a card is performed while the card is moved from the closing part side toward the opening part side.

Further, as a card reader for reading magnetic information which is recorded on a card, a card reader has been known in which a pad roller is disposed at a position facing a magnetic gap of a magnetic head (see, for example, Patent Literature 2). In the card reader described in Patent Literature 2, a card is surely abutted with the magnetic gap of the magnetic head and thus a spacing loss is capable of being eliminated.

CITATION LIST

Patent Literature

[PTL 1] Japanese Patent Laid-Open No. Hei 7-244709
[PTL 2] Japanese Patent Laid-Open No. 2005-196375

As described above, in the card reader in which the pad roller is disposed at a position facing the magnetic gap, a spacing loss can be eliminated and, as a result, magnetic information of a card can be read appropriately. However, in the card reader in which a pad roller is disposed at a position facing the magnetic gap, another mechanism cannot be disposed at the position facing the magnetic gap. Therefore, in the card reader, it is difficult to enhance a degree of freedom in design.

In view of the problem described above, at least an embodiment of the present invention provides an information reading device which is capable of enhancing a degree of freedom in design and is capable of appropriately reading magnetic information recorded on an information recording medium.

SUMMARY

In order to solve the problem, at least an embodiment of the present invention provides an information reading device including a medium passage through which an information recording medium on which magnetic information is recorded is passed, a magnetic head for abutting with the information recording medium which is passed through the medium passage and for reading the magnetic information recorded on the information recording medium, a guide part for guiding the information recording medium so as to apply a force so that, when the information recording medium and the magnetic head are abutted with each other, the information recording medium and the magnetic head are mutually pressed against each other, and an urging mechanism for urging the magnetic head and/or the guide part in a direction in which the information recording medium and the magnetic head are abutted with each other. The guide part is not disposed at a position facing a magnetic gap which is formed at a tip end of the magnetic head, and the guide part is disposed on an upstream side with respect to the magnetic gap in a passing direction of the information recording medium.

An information reading device is provided with a guide part for guiding an information recording medium so as to apply a force so that, when the information recording medium and the magnetic head are abutted with each other, the information recording medium and the magnetic head are mutually pressed against each other, and an urging mechanism for urging the magnetic head and/or the guide part in a direction in which the information recording medium and the magnetic head are abutted with each other. Therefore, magnetic information recorded on an information recording medium can be appropriately read by the magnetic head without a spacing loss. Further, the guide part is not disposed at a position facing a magnetic gap which is formed at a tip end of the magnetic head, and the guide part is disposed on an upstream side with respect to the magnetic gap in a passing direction of the information recording medium. In other words, a mechanism for eliminating a spacing loss is not disposed at a position facing the magnetic gap. Therefore, various mechanisms can be disposed at a position facing the magnetic gap and, as a result, a degree of freedom in design can be enhanced.

In at least an embodiment of the present invention, the information reading device is, for example, provided with a first side wall part to which the magnetic head is attached and a second side wall part which is oppositely disposed to the first side wall part for forming the medium passage together with the first side wall part. The guide part is structured of a first guide part which is formed in or attached to the first side wall part and a second guide part which is formed in or attached to the second side wall part.

In at least an embodiment of the present invention, it is preferable that the second guide part guides the information recording medium so that a tip end of the information recording medium in the passing direction of the information recording medium is abutted with an inclined part which is formed on a tip end side of the magnetic head. In this case, for example, the second guide part is an inclined face which is inclined toward the magnetic head as going to a downstream side in the passing direction of the information recording medium. Further, it is preferable that the tip end of the magnetic head is disposed on a second side wall part side in a facing direction of the first side wall part and the second side wall part with respect to a first side wall part side end of a downstream side end of the second guide part in the passing direction of the information recording medium. According to this structure, the information recording medium and the magnetic gap can be surely abutted with each other.

In at least an embodiment of the present invention, it is preferable that a turning prevention part is formed on a downstream side of the second side wall part with respect to the magnetic gap in the passing direction of the information recording medium for preventing turning of the information recording medium with a direction perpendicular to the passing direction of the information recording medium and a thickness direction of the information recording medium as an axial direction when the information recording medium and the magnetic head are abutted with each other. According to this structure, the information recording medium and the magnetic gap can be surely abutted with each other.

In at least an embodiment of the present invention, it is preferable that a first side wall part side end of an upstream side end of the turning prevention part in the passing direction of the information recording medium is disposed on a second side wall part side in the facing direction of the first side wall part and the second side wall part with respect to a first side wall part side end of a downstream side end of the second guide part in the passing direction of the information recording medium. According to this structure, a tip end of the information recording medium passing through the medium passage can be prevented from being caught by the turning prevention part.

In at least an embodiment of the present invention, it is preferable that a distance in the passing direction of the information recording medium between a first side wall part side end of a downstream side end of the second guide part in the passing direction of the information recording medium and the magnetic gap is set to be shorter than a distance in the passing direction of the information recording medium between a rear end of the information recording medium in the passing direction of the information recording medium and a rear end of a magnetic information recording area on the information recording medium. According to this structure, when the rear end of the information recording medium is passed through the first side wall part side end of the downstream side end of the second guide part and the rear end of the information recording medium comes out from the first side wall part side end of the downstream side end of the second guide part, the rear end of the magnetic information recording area has been passed through the magnetic gap. Therefore, reading accuracy of the magnetic information can be prevented from being lowered due to variation of a passing speed of the information recording medium when the rear end of the information recording medium comes out from the first side wall part side end of the downstream side end of the second guide part.

In at least an embodiment of the present invention, it is preferable that the urging mechanism urges the magnetic head and holds the magnetic head so as to be capable of swinging the magnetic head with the passing direction of the information recording medium as an axial direction and/or capable of swinging the magnetic head with a thickness direction of the information recording medium as an axial direction. According to this structure, the information recording medium and the magnetic gap can be surely abutted with each other by making the magnetic head follow the information recording medium.

In at least an embodiment of the present invention, it is preferable that the information reading device is provided with an image reading part having an optical transparent member which is disposed to face the medium passage. The image reading part reads a surface of the information recording medium to acquire an image on the information recording medium and the image reading part is attached to the second side wall part so as to be oppositely disposed to the magnetic head in a facing direction of the first side wall part and the second side wall part. According to this structure, the size of the information reading device can be reduced in the passing direction of the information recording medium. Further, reading accuracy of image can be prevented from lowering due to variation of a passing speed of the information recording medium when the tip end of the information recording medium begins to contact with the magnetic head or, when the rear end of the information recording medium comes out from the magnetic head.

In at least an embodiment of the present invention, it is preferable that a first side wall part side end face of the optical transparent member is disposed on the second side wall part side in the facing direction of the first side wall part and the second side wall part with respect to a first side wall part side end of a downstream side end of the second guide part in the passing direction of the information recording medium. According to this structure, the optical transparent member can be prevented from being scratched due to contact of the information recording medium with the optical transparent member.

In at least an embodiment of the present invention, it is preferable that, in a state that the information recording medium and the magnetic head are not abutted with each other, a predetermined gap space is formed between the tip end of the magnetic head and the optical transparent member in the facing direction of the first side wall part and the second side wall part. According to this structure, the optical transparent member can be prevented from being scratched due to contact of the magnetic head with the optical transparent member.

In at least an embodiment of the present invention, it is preferable that the predetermined gap space between the tip end of the magnetic head and the optical transparent member in the facing direction of the first side wall part and the second side wall part is smaller than a sum of a minimum thickness of the information recording medium which is used in the information reading device and a depth of field of the image reading part. According to this structure, the information recording medium and magnetic gap are surely abutted with each other and magnetic information can be read appropriately and an image on the information recording medium can be appropriately acquired by the image reading part.

In at least an embodiment of the present invention, it is preferable that the first side wall part is provided with an opening/closing part which is capable of opening or closing with respect to the second side wall part and the magnetic head is attached to the opening/closing part. According to this structure, even when the magnetic head is oppositely disposed to the image reading part, maintenance of the image reading part can be performed relatively easily.

In at least an embodiment of the present invention, it is preferable that the second guide part is formed of metal. According to this structure, abrasion of the second guide part can be restrained. Further, damage of the image reading part due to static electricity can be prevented by discharging an information recording medium which is charged with electricity through the second guide part.

In at least an embodiment of the present invention, it is preferable that the information reading device is provided with a pressing member which is oppositely disposed to the image reading part in the facing direction of the first side wall part and the second side wall part. The pressing member is attached to the first side wall part so as to be adjacent to the magnetic head in a direction substantially perpendicular to the facing direction of the first side wall part and the second side wall part and the passing direction of the information recording medium, and the pressing member presses the information recording medium which is passed through the medium passage toward the image reading part. The urging mechanism urges the magnetic head. In this case, the image reading part is, for example, a contact type scanner.

According to this structure, even when a width of the image reading part in a direction substantially perpendicular to the facing direction of the first side wall part and the second side wall part and the passing direction of the information recording medium is set to be wider than a width of the magnetic head, the information recording medium passing through the medium passage can be pressed toward the image reading part by the magnetic head and the pressing member in a predetermined range in the direction substantially perpendicular to the facing direction of the first side wall part and the second side wall part and the passing direction of the information recording medium, and the information recording medium passing through the medium passage can be passed within the depth of field of the image reading part. Therefore, the image on the information recording medium can be acquired appropriately by the image reading part. Especially, in a case that the image reading part is a contact type scanner, the depth of field is shallow and thus, unless the information recording medium passing through the medium passage is appropriately pressed toward the image reading part, the image reading part is difficult to appropriately acquire the image of the information recording medium. However, according to this structure, the image of the information recording medium can be appropriately acquired by the image reading part.

In at least an embodiment of the present invention, it is preferable that the pressing member is a pad roller which is capable of abutting with the information recording medium passing through the medium passage and that the pressing member is capable of rotating with a direction substantially perpendicular to the facing direction of the first side wall part and the second side wall part and the passing direction of the information recording medium as an axial direction. According to this structure, even when an information recording medium which passes through the medium passage is pressed toward the image reading part by the pressing member, the information recording medium can be smoothly passed.

In at least an embodiment of the present invention, it is preferable that the information reading device is provided with an urging member which is separately provided from the urging mechanism for urging the pressing member toward the information recording medium which is passed through the medium passage. According to this structure, the pressing member is not required to be urged by the urging mechanism. Therefore, when the structure of the urging mechanism is to be taken into consideration, followability of the magnetic head to the information recording medium, an abutting force of the magnetic head with an information recording medium and the like may be required to be taken into consideration without considering the structure for urging the pressing member. As a result, the information recording medium and the magnetic gap can be surely abutted with each other by making the magnetic head follow the information recording medium through the urging mechanism. Further, when the structure of the urging member is to be taken into consideration, an abutting force of the pressing member with the information recording medium, followability of the pressing member to the information recording medium and the like may be required to be taken into consideration without considering the structure for urging the magnetic head and thus the information recording medium and the pressing member can be surely abutted with each other by making the pressing member follow the information recording medium through the urging member. Therefore, the information recording medium passing through the medium passage can be further appropriately pressed toward the image reading part by the magnetic head and the pressing member and, as a result, an image on the information recording medium can be further appropriately acquired by the image reading part.

In at least an embodiment of the present invention, it is preferable that the first side wall part is provided with an opening/closing part which is capable of opening or closing with respect to the second side wall part, and the magnetic head and the pressing member are attached to the opening/closing part. According to this structure, even when the magnetic head and the pressing member are oppositely disposed to the image reading part, maintenance of the image reading part can be performed relatively easily.

As described above, in the information reading device, a degree of freedom in design can be enhanced and magnetic information recorded on an information recording medium can be read appropriately.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 7 is an explanatory view showing an attaching structure of a magnetic head which is viewed in an "H-H" direction in FIG. 6.

FIGS. 8(A) and 8(B) are views showing states when an information recording medium is passed through a surrounding portion of a magnetic head and a scanner shown in FIG. 6. FIG. 8(A) shows a state when a tip end of the information recording medium begins to contact with the magnetic head and FIG. 8(B) shows a state just after the tip end of the information recording medium is passed through a magnetic gap of the magnetic head.

FIGS. 9(A) and 9(B) are views showing states when an information recording medium is passed through the surrounding portion of the magnetic head and the scanner shown in FIG. 6. FIG. 9(A) is a view showing a state in which the information recording medium is being passed through a medium passage while the information recording medium is abutted with the magnetic gap of the magnetic head. FIG. 9(B) is a view showing a state just before a rear end of the information recording medium comes out from a second inclined face part.

FIGS. 10(A) and 10(B) are views showing a surrounding portion of a magnetic head and a scanner in accordance with another embodiment of the present invention.

DESCRIPTION OF EMBODIMENTS

Embodiments of the present invention will be described below with reference to the accompanying drawings.

(Schematic Structure of Information Reading Device)

Figure 1:
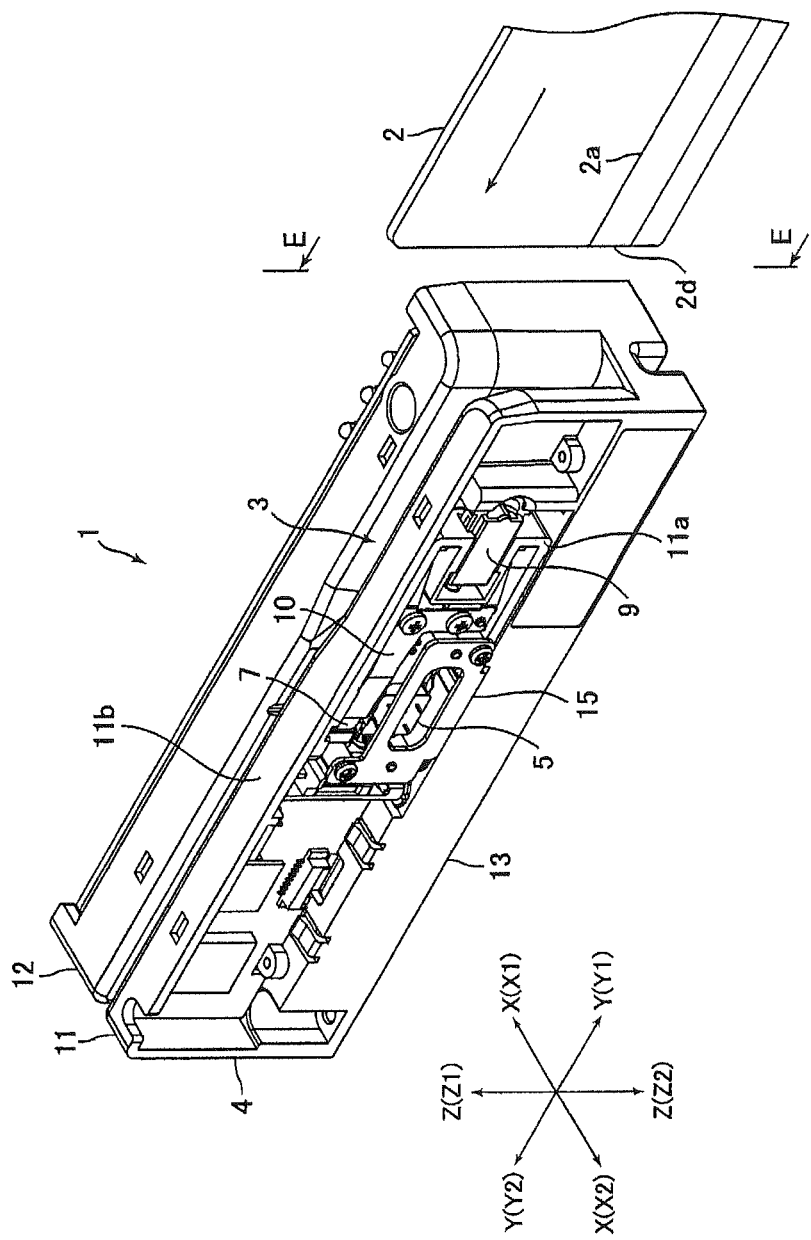
FIG. 1 is a perspective view showing an information reading device in accordance with an embodiment of the present invention.
Figure 2:
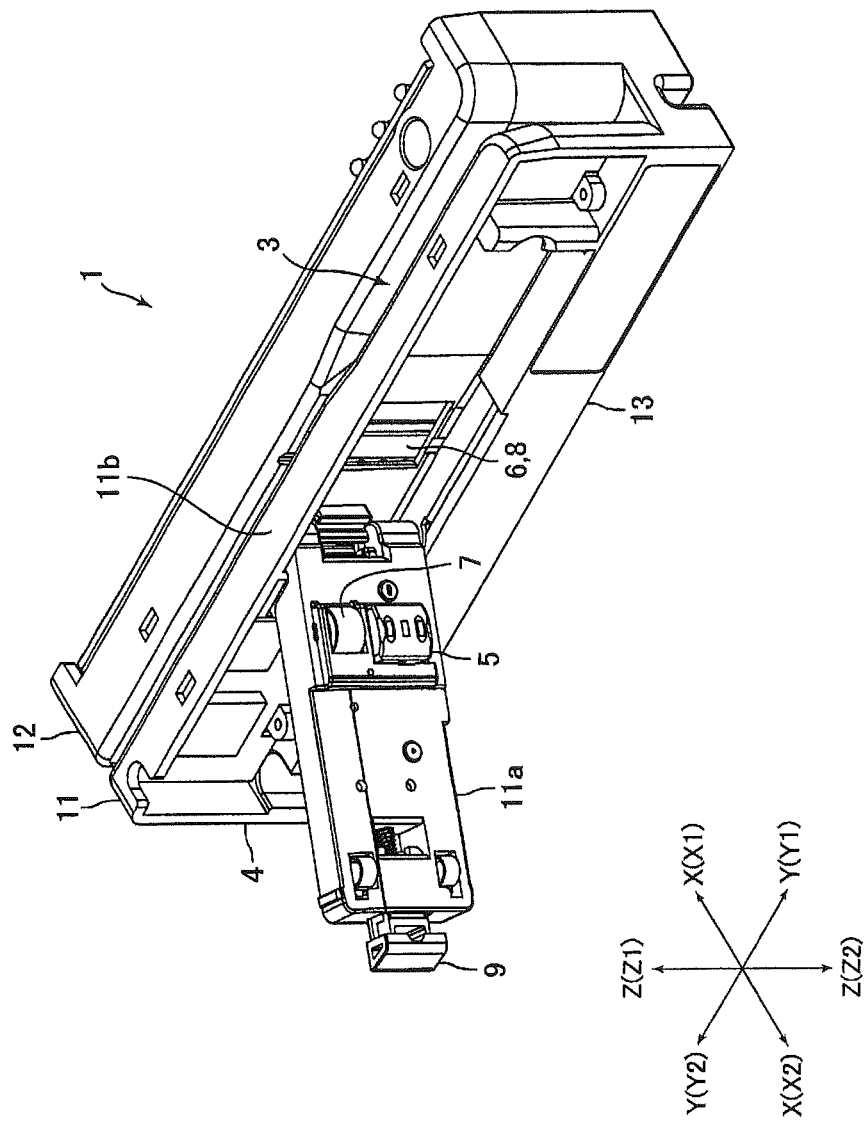
FIG. 2 is a perspective view showing a state where an opening/closing part of the information reading device shown in FIG. 1 has been opened.
Figure 3:
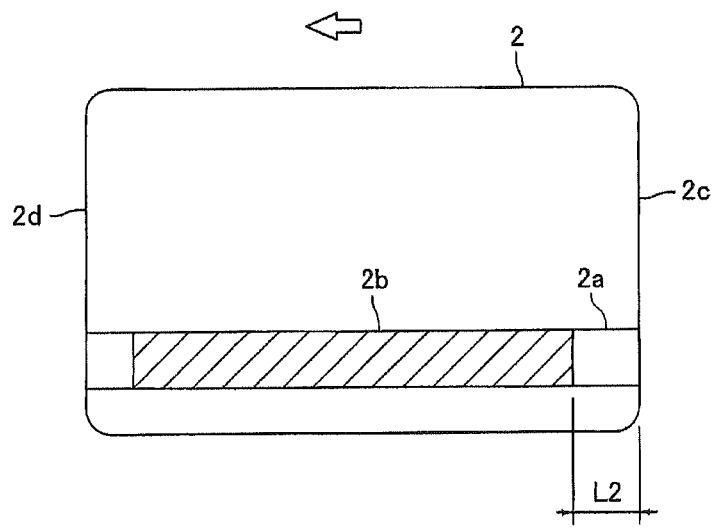
FIG. 3 is a plan view showing an information recording medium shown in FIG. 1.
Figure 4:
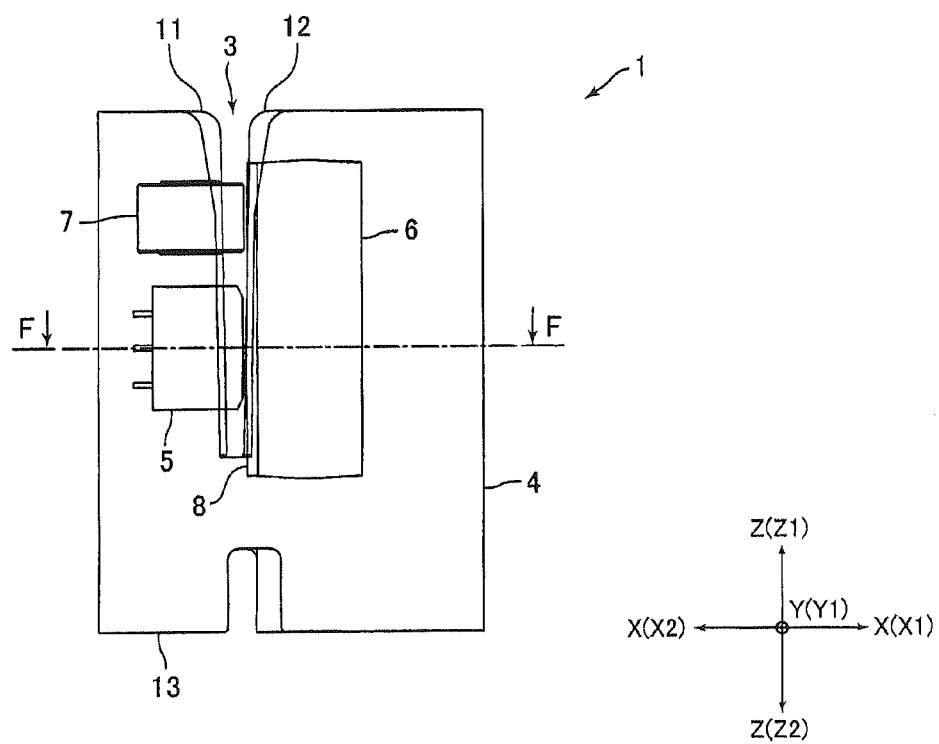
FIG. 4 is an explanatory view showing an arrangement relationship of a magnetic head, a scanner and a pad roller which are viewed in the "E-E" direction in FIG. 1.
Figure 5:
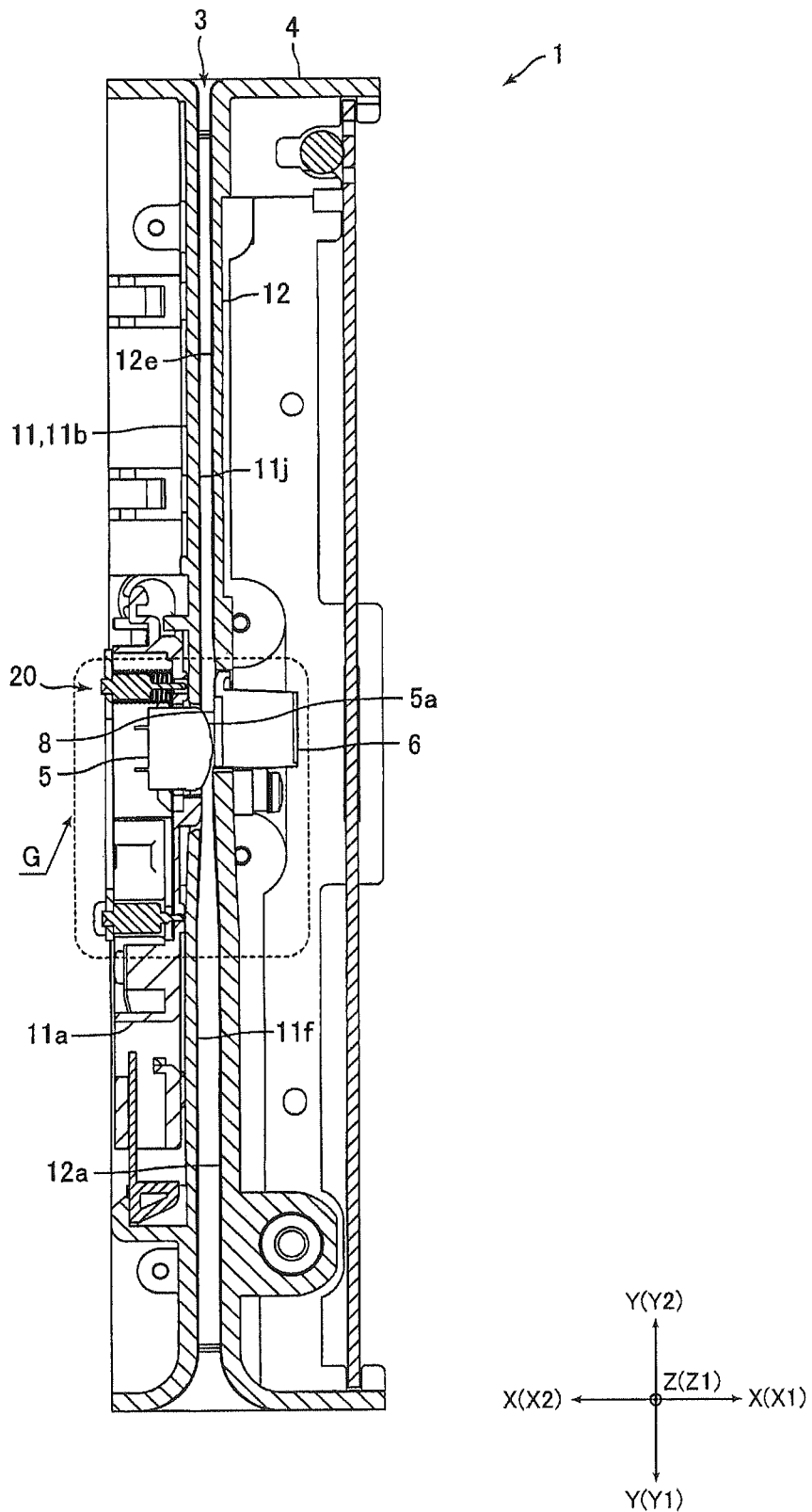
FIG. 5 is a cross-sectional view showing the information reading device which corresponds to an "F-F" cross section in FIG. 4.

FIG. 1 is a perspective view showing an information reading device 1 in an embodiment of the present invention. FIG. 2 is a perspective view showing a state where an opening/closing part 11a of the information reading device 1 shown in FIG. 1 has been opened. FIG. 3 is a plan view showing an information recording medium 2 shown in FIG. 1. FIG. 4 is an explanatory view showing an arrangement relationship of a magnetic head 5, a scanner 6 and a pad roller 7 which are viewed in the "E-E" direction in FIG. 1. FIG. 5 is a cross-sectional view showing the information reading device 1 which corresponds to an "F-F" cross section in FIG. 4.

In the following description, as shown in FIG. 1 and the like, three directions perpendicular to each other are set to be an "X" direction, a "Y" direction and a "Z" direction. Further, an "X1" direction side in FIG. 1 is referred to as a "right" side, an "X2" direction side is as a "left" side, a "Y1" direction side is as a "front" side, a "Y2" direction side is as a "rear" side, a "Z1" direction side is an "upper" side, and a "Z2" direction side is as a "lower" side.

The information reading device 1 in this embodiment is a device for reading magnetic information, which is recorded on an information recording medium 2, by manually operating the information recording medium 2 by a user. Further, the information reading device 1 in this embodiment is a device for acquiring an image on the information recording medium 2 by manually operating the information recording medium 2 by a user. Specifically, the information reading device 1 is a so-called swipe type information reading device for reading magnetic information on the information recording medium 2 and for acquiring an image on the information recording medium 2 while the information recording medium 2 is moved along a medium passage 3 which is formed in a groove shape (while the information recording medium 2 is passed through the medium passage 3).

In this embodiment, the information reading device 1 is structured so that reading of magnetic information on the information recording medium 2 and acquisition of an image on the information recording medium 2 are performed while a user moves the information recording medium 2 from a front side toward a rear side (to the "Y2" direction) of the information reading device 1. In other words, in this embodiment, the "Y2" direction is a passing direction of the information recording medium 2. Further, the information reading device 1 is, as shown in FIG. 1, formed in a long and thin and substantially rectangular prism shape whose longitudinal direction is a front and rear direction. Further, in this embodiment, a right and left direction is a thickness direction of the information recording medium 2, the front and rear direction is a length direction (longitudinal direction) of the information recording medium 2, and an upper and lower direction is a width direction (short side direction) of the information recording medium 2.

The information recording medium 2 is, for example, a card having a rectangular shape which is made of vinyl chloride and whose thickness is about 0.7-0.8 mm. A magnetic stripe 2a on which magnetic information is recorded is formed on the surface of the information recording medium 2 as shown in FIG. 3. In other words, the information recording medium 2 is a magnetic card. The magnetic stripe 2a is formed in a long and thin rectangular shape whose longitudinal direction is the length direction of the information recording medium 2. Further, characters, a figure, a pattern and the like are described on a surface of the information recording medium 2 (specifically, on a face opposite to the face where the magnetic stripe 2a is formed). Alternatively, a bar-code and the like are printed on the surface of the information recording medium 2. In accordance with an embodiment of the present invention, when provided with a predetermined rigidity, a medium other than a card made of vinyl chloride may be used as the information recording medium 2. For example, the information recording medium 2 may be a paper medium such as a passport. Further, the information recording medium 2 may be a PET (polyethylene terephthalate) card whose thickness is about 0.18-0.36 mm or a paper card having a predetermined thickness.

The information reading device 1 is, as shown in FIGS. 2, 4 and 5, provided with a main body frame 4 in which a medium passage 3 is formed, a magnetic head 5 which is abutted with an information recording medium 2 passing through the medium passage 3 to read magnetic information that is recorded on the information recording medium 2, a scanner 6 as an image reading part by which characters, a bar-code and the like on the surface of the information recording medium 2 are read to acquire an image on the information recording medium 2, and a pad roller 7 as a pressing member which is disposed so as to face the scanner 6 for pressing the information recording medium 2 passing through the medium passage 3 toward the scanner 6.

A magnetic gap (not shown) is formed at a tip end of the magnetic head 5. Further, a tip end side of the magnetic head 5 is formed with an inclined part 5a which is gradually inclined from both end faces in the front and rear direction of the magnetic head 5 toward the tip end of the magnetic head 5. The inclined part 5a in this embodiment is formed in a convex curved shape (see FIG. 6).

The scanner 6 is a so-called contact type scanner (image sensor) which is provided with an optical transparent member 8 such as glass. The optical transparent member 8 is fixed on a left end face of the scanner 6.

The main body frame 4 is, for example, formed of resin. The main body frame 4 is provided with a first side wall part 11 and a second side wall part 12 which are disposed so as to face each other with a predetermined space therebetween in the right and left direction. The first side wall part 11 and the second side wall part 12 are formed so as to protrude toward an upper side from a base end part 13 which structures a lower end side of the main body frame 4. The medium passage 3 is formed between the first side wall part 11 and the second side wall part 12. Specifically, in this embodiment, the first side wall part 11 is disposed on the left side and the second side wall part 12 is disposed on the right side. The medium passage 3 is structured of a right side face of the first side wall part 11, a left side face of the second side wall part 12, and an upper side face of the base end part 13. In this embodiment, the first side wall part 11 and the second side wall part 12 are oppositely disposed to each other in the right and left direction.

The medium passage 3 is formed over an entire region from the front end of the main body frame 4 to its rear end. Further, a width in the right and left direction of the front end side of the medium passage 3 is set to be wider than a width in the right and left direction of the rear end side of the medium passage 3. A depth of the medium passage 3 (depth in the upper and lower direction) is set to be shorter than a width in a short widthwise direction of the information recording medium 2 and an upper end side of the information recording medium 2 passing through the medium passage 3 is exposed to the outer side of the main body frame 4.

In this embodiment, when magnetic information on an information recording medium 2 is to be read or, when an image on the information recording medium 2 is to be acquired, a user holds an upper end side of the information recording medium 2 which is exposed on the outer side of the main body frame 4 and moves the information recording medium 2 to the rear side so that the information recording medium 2 is passed through the medium passage 3. In this case, in order to coincide a position of the magnetic head 5 with a position of the magnetic stripe 2a in the upper and lower direction and, in order to coincide positions of characters and the like on the information recording medium 2 with a position of the scanner 6 in the upper and lower direction, a user is required to move the information recording medium 2 while pressing the information recording medium 2 against the upper side face of the base end part 13. In other words, the upper side face of the base end part 13 functions as a reference face for coinciding the position of the magnetic head 5 with the position of the magnetic stripe 2a in the upper and lower direction and for coinciding the characters and the like on the information recording medium 2 with the position of the scanner 6 in the upper and lower direction.

The scanner 6 is attached to the second side wall part 12. Specifically, the scanner 6 is fixed at a substantially center position of the second side wall part 12 in the front and rear direction. Further, the scanner 6 is fixed to the second side wall part 12 so that the optical transparent member 8 faces the medium passage 3.

The first side wall part 11 is provided with an opening/closing part 11a which is capable of being opened or closed with respect to the second side wall part 12. In other words, the first side wall part 11 is provided with a fixed part 11b which is fixed to the base end part 13 and the opening/closing part 11a which is capable of being opened or closed with respect to the fixed part 11b. The opening/closing part 11a is, as shown in FIG. 2, capable of being turned with the rear end side as a turning center whose axial direction is the upper and lower direction. In other words, the opening/closing part 11a is set to be in a closed state or an opened state with respect to the second side wall part 12 by being turned with the rear end side as a turning center. In this embodiment, a lock mechanism 9 is attached to a front end of the opening/closing part 11a for maintaining the closed state of the opening/closing part 11a.

The magnetic head 5 and the pad roller 7 are attached to the first side wall part 11. Specifically, as shown in FIG. 2, the magnetic head 5 and the pad roller 7 are attached to the opening/closing part 11a so that the magnetic head 5 and the pad roller 7 are adjacent to each other in the upper and lower direction. Further, as shown in FIG. 4, the magnetic head 5 and the pad roller 7 are attached to the opening/closing part 11a so that a tip end side of the magnetic head 5 and an outer peripheral face of the pad roller 7 are protruded toward the medium passage 3 in a state that the opening/closing part 11a is closed with respect to the second side wall part 12.

The pad roller 7 is attached to the opening/closing part 11a so as to be capable of abutting with the information recording medium 2 which is passed through the medium passage 3. Further, the pad roller 7 is attached to the opening/closing part 11a so as to be capable of being rotated with the upper and lower direction as its rotating axial direction. Specifically, the pad roller 7 is rotatably attached to a fixed shaft which is fixed to the opening/closing part 11a with the upper and lower direction as its axial direction.

The pad roller 7 is urged toward the medium passage 3 (toward the right side) by a plate spring 10 (see FIG. 1). Specifically, both end portions in the upper and lower direction of a fixing shaft to which the pad roller 7 is attached is urged toward the medium passage 3 by the plate spring 10. In other words, the pad roller 7 is urged by the plate spring 10 in a direction that an information recording medium 2 passing through the medium passage 3 and the pad roller 7 are abutted with each other, and the pad roller 7 functions to press the information recording medium 2 passing through the medium passage 3 toward the scanner 6. The plate spring 10 in this embodiment is an urging member for urging the pad roller 7 toward the information recording medium 2 passing through the medium passage 3. The plate spring 10 is separately structured from an urging mechanism 20 described below which urges the magnetic head 5 in a direction that the information recording medium 2 passing through the medium passage 3 and the magnetic head 5 are abutted with each other. An attaching structure of the magnetic head 5 to the opening/closing part 11a will be described below.

Further, the magnetic head 5 and the pad roller 7 are attached to the opening/closing part 11a so that the magnetic head 5 and the pad roller 7 are oppositely disposed to the scanner 6 in the right and left direction in a state that the opening/closing part 11a is closed with respect to the second side wall part 12. Specifically, the magnetic head 5 and the pad roller 7 are attached to the opening/closing part 11a so that the magnetic gap of the tip end of the magnetic head 5 and the outer peripheral face of the pad roller 7 are oppositely disposed to the optical transparent member 8 of the scanner 6 in a state that the opening/closing part 11a is closed with respect to the second side wall part 12. Therefore, when the opening/closing part 11a is set to be in an opened state, as shown in FIG. 2, the optical transparent member 8 of the scanner 6 is exposed. Further, in this embodiment, a width of the scanner 6 in the upper and lower direction is set to be wider than a width of the magnetic head 5 and a width of the pad roller 7 in the upper and lower direction.

(Attaching Structure of Magnetic Head)

Figure 6:
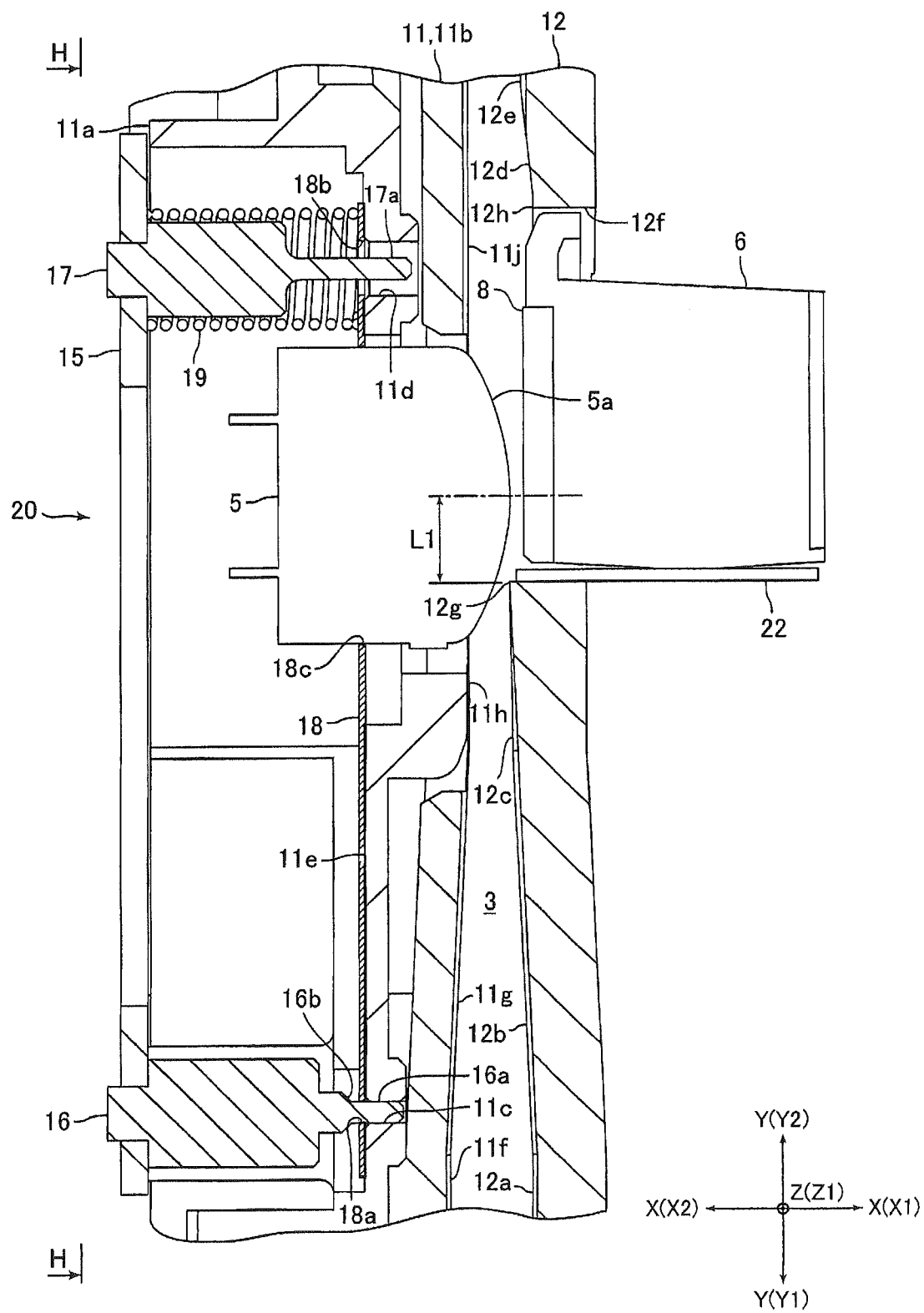
FIG. 6 is an enlarged view showing a "G" part in FIG. 5.

FIG. 6 is an enlarged view showing a "G" part in FIG. 5. FIG. 7 is an explanatory view showing an attaching structure of the magnetic head 5 which is viewed in an "H-H" direction in FIG. 6.

As described above, the magnetic head 5 is attached to the opening/closing part 11a. Specifically, the magnetic head 5 is attached to the opening/closing part 11a by utilizing a fixing plate 15, which is formed in a flat plate shape and is fixed to the opening/closing part 11a, two fixed pins 16 and 17 which are fixed to the fixing plate 15, a plate spring 18 to which the magnetic head 5 is fixed, and a compression coil spring 19 which urges the plate spring 18.

The fixing plate 15 is fixed to a left end face of the opening/closing part 11a. The fixed pins 16 and 17 are fixed to the fixing plate 15 so as to have a predetermined space therebetween in the front and rear direction. Specifically, the fixed pin 16 is fixed to the front end side of the fixing plate 15 and the fixed pin 17 is fixed to the rear end side of the fixing plate 15. Further, the fixed pins 16 and 17 are fixed to the fixing plate 15 so as to protrude from the fixing plate 15 toward the right side. Further, the fixed pins 16 and 17 are, as shown in FIG. 6, formed in a substantially cylindrical shape having a stepped part. Tip end sides (right end side) of the fixed pins 16 and 17 are formed in small diameter parts 16a and 17a whose diameter is smaller than the base end side (left end side).

The plate spring 18 is, as shown in FIG. 6, formed with insertion holes 18a into which the small diameter part 16a is inserted. The insertion hole 18a is formed in a round hole shape and a diameter of the insertion hole 18a is set to be slightly larger than a diameter of the small diameter part 16a. In other words, a slight gap space is formed between an inner peripheral face of the insertion hole 18a and an outer peripheral face of the small diameter part 16a. Therefore, a front end side of the plate spring 18 is movable in the right and left direction. In this embodiment, the fixed pin 16 is, as shown in FIG. 6, formed with a taper part 16b whose diameter becomes gradually larger toward the left side so as to be connected with the left end of the small diameter part 16a. Movement in the left direction of the front end side of the plate spring 18 is restricted by the taper part 16b.

Further, the plate spring 18 is formed with an insertion hole 18b into which the small diameter part 17a is inserted. The insertion hole 18b is formed in an elongated hole whose longitudinal direction is the front and rear direction and a width of the insertion hole 18b in the upper and lower direction is slightly larger than a diameter of the small diameter part 17a. In other words, a slight gap space is formed between an inner peripheral face of the insertion hole 18b and an outer peripheral face of the small diameter part 17a. Therefore, a rear end side of the plate spring 18 is movable in the right and left direction.

An opening part 18c to which the magnetic head 5 is fixed is formed on the rear end side with respect to the center in the front and rear direction of the plate spring 18. The magnetic head 5 is fixed to the plate spring 18 in a state that the magnetic head 5 is inserted into the opening part 18c.

The opening/closing part 11a is formed with an insertion hole 11c into which the small diameter part 16a is inserted. The insertion hole 11c is formed in a round hole shape and a diameter of the insertion hole 11c is set to be slightly larger than the diameter of the small diameter part 16a. Further, the opening/closing part 11a is formed with an insertion hole 11d into which the small diameter part 17a is inserted. The insertion hole 11d is formed in a long hole whose longitudinal direction is the front and rear direction and a width of the insertion hole 11c in the upper and lower direction is slightly larger than a diameter of the small diameter part 17a. Further, the opening/closing part 11a is formed with an abutting face 11e with which a right side face of the plate spring 18 is abutted. In accordance with an embodiment of the present invention, the insertion hole 11d may be formed in a round hole shape whose diameter is larger than the diameter of the small diameter part 17a.

A compression coil spring 19 is fitted to the fixed pin 17. A left end of the compression coil spring 19 is abutted with a right side face on the rear end side of the fixing plate 15, a right end of the compression coil spring 19 is abutted with a left side face on the rear end side of the plate spring 18, and the rear end side of the plate spring 18 is urged toward the right side by the compression coil spring 19.

Since the magnetic head 5 is attached to the opening/closing part 11a by utilizing the fixing plate 15, the fixed pins 16 and 17, the plate spring 18 and the compression coil spring 19, which are structured as described above, the magnetic head 5 is urged toward the medium passage 3. In this embodiment, an urging mechanism 20 for urging the magnetic head 5 in a direction that the information recording medium 2 passing through the medium passage 3 and the magnetic head 5 are abutted with each other is structured by utilizing the fixing plate 15, the fixed pins 16 and 17, the plate spring 18 and the compression coil spring 19.

Further, in this embodiment, the magnetic head 5 is held in the urging mechanism 20 so as to be capable of swinging with the front and rear direction as an axial direction. Specifically, the magnetic head 5 is held in the urging mechanism 20 so as to be capable of swinging with a line connecting the small diameter part 16a with the small diameter part 17a as a swing axis when viewed in the upper and lower direction. Further, the magnetic head 5 is held in the urging mechanism 20 so as to be capable of swinging with the fixed pin 16 as a center and with the right and left direction as an axial direction As described above, the magnetic head 5 is held by a so-called gimbal structure and thus, the magnetic gap of the magnetic head 5 can be perpendicularly abutted with the information recording medium 2 by resiliently bending of the plate spring 18 and/or the compression coil spring 19.

(Structure of Medium Passage Surrounding Magnetic Head and Scanner)

FIGS. 8(A) and 8(B) are views showing states when an information recording medium 2 is passed through a surrounding portion of the magnetic head 5 and the scanner 6 shown in FIG. 6. FIG. 8(A) shows a state when a tip end 2d of the information recording medium 2 begins to contact with the magnetic head 5 and FIG. 8(B) shows a state just after the tip end 2d of the information recording medium 2 is passed through the magnetic gap of the magnetic head 5. FIGS. 9(A) and 9(B) are views showing states when the information recording medium 2 is passed through the surrounding portion of the magnetic head 5 and the scanner 6 shown in FIG. 6. FIG. 9(A) is a view showing a state in which the information recording medium 2 is being passed through the medium passage 3 while the information recording medium 2 is abutted with the magnetic gap of the magnetic head 5. FIG. 9(B) is a view showing a state just before a rear end of the information recording medium 2 comes out from a second inclined face part 12c.

The structure of the medium passage 3 surrounding the magnetic head 5 and the scanner 6 will be described below based on FIGS. 5 and 6 and FIG. 8(A) through 9(B).

As described above, the medium passage 3 is formed between the first side wall part 11 and the second side wall part 12. Specifically, the medium passage 3 is structured of the right side face of the first side wall part 11, the left side face of the second side wall part 12 and the upper side face of the base end part 13.

The right side face of the first side wall part 11 is provided with a first side face part 11f, an inclined side face part 11g and a second side face part 11h, which are disposed on an upstream side (in other words, front side) with respect to the magnetic head 5 in a passing direction of the information recording medium 2, and a third side face part 11j which is disposed on a downstream side (in other words, rear side) with respect to the magnetic head 5. The first side face part 11f, the inclined side face part 11g and the second side face part 11h are disposed from the upstream side toward the downstream side in this order. The first side face part 11f, the second side face part 11h and the third side face part 11j are formed in a flat-like face which is substantially parallel to the front and rear direction. The inclined side face part 11g is formed in a flat-like face which is gradually inclined to the right side toward the downstream side.

The left side face of the second side wall part 12 is provided with a first side face part 12a, a first inclined side face part 12b and a second inclined side face part 12c, which are disposed on the upstream side with respect to the scanner 6 in the passing direction of the information recording medium 2 (specifically, upstream side with respect to the magnetic gap of the magnetic head 5), and a third inclined side face part 12d and a second side face part 12e which are disposed on the downstream side with respect to the scanner 6 (specifically, downstream side with respect to the magnetic gap of the magnetic head 5). The first side face part 12a, the first inclined side face part 12b and the second inclined side face part 12c are disposed from the upstream side toward the downstream side in this order. The third inclined side face part 12d and the second side face part 12e are disposed from the upstream side toward the downstream side in this order. Further, an opening part 12f on which the scanner 6 is disposed is formed between the second inclined side face part 12c and the third inclined side face part 12d.

The first side face part 12a and the second side face part 12e are formed in a flat-like face which is substantially parallel to the front and rear direction. The first inclined side face part 12b and the second inclined side face part 12c are formed in a flat-like face which is gradually inclined to the left side toward the downstream side. In other words, the first inclined side face part 12b and the second inclined side face part 12c are inclined toward the magnetic head 5 as going to the downstream side. In this embodiment, an inclination angle of the first inclined side face part 12b with respect to the front and rear direction is set to be slightly larger than an inclination angle of the second inclined side face part 12c with respect to the front and rear direction. Further, the third inclined side face part 12d is formed in a flat-like face which is gradually inclined to the left side as going to the downstream side.

In this embodiment, a discharge electrode 22 is disposed between the scanner 6 and the second inclined side face part 12c for discharging an information recording medium 2 charged with electricity to prevent damage of the scanner 6 due to static electricity.

In this embodiment, the tip end of the magnetic head 5 where the magnetic gap is formed is disposed on a slightly right side with respect to a left end 12g (see FIG. 6) of the downstream side end of the second inclined side face part 12c in the right and left direction. Further, a left end face of the optical transparent member 8 is disposed on a right side with respect to the left end 12g of a downstream side end of the second inclined side face part 12c in the right and left direction. In addition, a left end 12h of an upstream side end of the third inclined side face part 12d (see FIG. 6) is disposed on a right side with respect to the left end 12g of the downstream side end of the second inclined side face part 12c in the right and left direction. Further, the left end 12h of the upstream side end of the third inclined side face part 12d is disposed on the right side with respect to the left end face of the optical transparent member 8 which faces medium passage 3 in the right and left direction.

As shown in FIG. 6, in a state that an information recording medium 2 and the magnetic head 5 are not abutted with each other, a predetermined gap space is formed between the tip end of the magnetic head 5 and the left end face of the optical transparent member 8 in the right and left direction. In other words, in a state that an information recording medium 2 and the magnetic head 5 are not abutted with each other, the plate spring 18 to which the magnetic head 5 is fixed is abutted with the abutting face 11e of the opening/closing part 11a so that a predetermined gap space is formed between the tip end of the magnetic head 5 and the left end face of the optical transparent member 8. In this embodiment, a gap space which is formed between the tip end of the magnetic head 5 and the left end face of the optical transparent member 8 when an information recording medium 2 and the magnetic head 5 are not abutted with each other is set to be smaller than a sum of a minimum thickness of an information recording medium 2 used in the information reading device 1 and a depth of field of the scanner 6.

Further, in this embodiment, a distance "L1" in the front and rear direction between the magnetic gap which is formed at the tip end of the magnetic head 5 and the downstream side end of the second inclined side face part 12c (see FIG. 6) is set to be shorter than a distance "L2" (see FIG. 3) between a rear end of a magnetic information recording area 2b (slanted line portion in FIG. 3) on the information recording medium 2 and a rear end 2c of the information recording medium 2 in the front and rear direction (longitudinal direction of the information recording medium 2).

When an information recording medium 2 is to be passed through the medium passage 3 from the upstream side toward the downstream side, as shown in FIG. 8(A), the tip end 2d of the information recording medium 2 is abutted with the inclined part 5a of the magnetic head 5 first. In other words, in this embodiment, the information recording medium 2 is guided by the second inclined side face part 12c so that the tip end 2d of the information recording medium 2 passing through the medium passage 3 from the upstream side toward the downstream side is abutted with the inclined part 5a of the magnetic head 5.

Further, when the information recording medium 2 is further moved from the upstream side to the downstream side, since the magnetic head 5 is urged to the right side by the urging mechanism 20, as shown in FIG. 8(B), a turning force is applied to the information recording medium 2 with the left end 12g of the downstream side end of the second inclined side face part 12c as a turning center in a clockwise direction in FIG. 8(B). Turning of the information recording medium 2 due to the turning force is restricted by the first side face part 11f before the tip end 2d of the information recording medium 2 is reached to the third inclined side face part 12d. In other words, turning of the information recording medium 2 based on the above-mentioned turning force is restricted since the rear end side of the information recording medium 2 is abutted with the first side face part 11f. (In FIG. 8(B), an abutting portion of the rear end side of the information recording medium 2 with the first side face part 11f is not shown).

Further, after the tip end 2d of the information recording medium 2 has been reached to the third inclined side face part 12d, turning of the information recording medium 2 due to the turning force occurred in the information recording medium 2 is restricted by the first side face part 11f and/or the third inclined side face part 12d or by the first side face part 11f and/or the second side face part 12e (see FIG. 9(A)). Further, when the information recording medium 2 is further moved from the upstream side to the downstream side from the state shown in FIG. 9(A), as shown in FIG. 9(B), turning of the information recording medium 2 due to the turning force occurred in the information recording medium 2 is restricted by the second side face part 12e.

As described above, in this embodiment, when an information recording medium 2 is moved to the downstream side in the abutted state with the magnetic head 5, turning of the information recording medium 2 with the left end 12g of the downstream side end of the second inclined side face part 12c as a turning center is restricted. Further, an information recording medium 2 has a predetermined rigidity. Therefore, when the information recording medium 2 and the magnetic head 5 are abutted with each other, mutually pressing forces are applied to each other between the information recording medium 2 and the magnetic head 5 by an urging force of the urging mechanism 20. In other words, in this embodiment, when the information recording medium 2 and the magnetic head 5 are abutted with each other, pressing forces are applied so that the magnetic head 5 presses the information recording medium 2 and the information recording medium 2 presses the magnetic head 5.

In this embodiment, even when a turning force is applied to the information recording medium 2 with the left end 12g of the downstream side end of the second inclined side face part 12c as a turning center before the tip end 2d of the information recording medium 2 is reached to the third inclined side face part 12d, the first side face part 11f is formed so that the information recording medium 2 is not abutted with the optical transparent member 8 or, so that even when abutted, the information recording medium 2 is abutted with the optical transparent member 8 with a small abutting force so as not to occur scratches.

Further, in this embodiment, the first side face part 11f is a first guide part which is formed in the first side wall part 11 and the second inclined side face part 12c is a second guide part which is formed in the second side wall part 12. In this embodiment, a guide part for guiding the information recording medium 2 is structured by the first side face part 11f and the second inclined side face part 12c so that mutually pressing forces of the information recording medium 2 and the magnetic head 5 are applied to each other when the information recording medium 2 and the magnetic head 5 are abutted with each other. The guide part is not disposed at a position facing the magnetic gap of the tip end of the magnetic head 5 and is disposed on the upstream side with respect to the magnetic gap in the front and rear direction.

Further, the third inclined side face part 12d and the second side face part 12e in this embodiment is a turning prevention part for preventing turning of the information recording medium 2 with the upper and lower direction as an axial direction when the information recording medium 2 and the magnetic head 5 are abutted with each other.

(Principal Effects in this Embodiment)

As described above, in the information reading device 1 in this embodiment, an information recording medium 2 is guided by the second inclined side face part 12c so that the tip end 2d of the information recording medium 2 passing through the medium passage 3 from the upstream side to the downstream side is abutted with the inclined part 5a of the magnetic head 5. Further, when the information recording medium 2 is further moved from the upstream side to the downstream side, turning of the information recording medium 2 with the left end 12g of the downstream side end of the second inclined side face part 12c as a turning center is restricted by the first side face part 11f, and the third inclined side face part 12d and/or the second side face part 12e. In addition, the magnetic head 5 is urged by the urging mechanism 20 to a direction in which the information recording medium 2 and the magnetic head 5 are abutted with each other and the information recording medium 2 has a predetermined rigidity.

Therefore, in this embodiment, when the information recording medium 2 and the magnetic head 5 are abutted with each other as described above, mutually pressing forces are generated between the information recording medium 2 and the magnetic head 5. Accordingly, in this embodiment, magnetic information recorded on the information recording medium 2 can be appropriately read by the magnetic head 5 without a spacing loss.

Especially in this embodiment, the tip end of the magnetic head 5 where the magnetic gap is formed is disposed on the slightly right side in the right and left direction with respect to the left end 12g of the downstream side end of the second inclined side face part 12c. Further, in this embodiment, the magnetic head 5 is held by the urging mechanism 20 so as to be capable of swinging with the front and rear direction as an axial direction and so as to be capable of swinging in the right and left direction with the fixed pin 16 as a center. Therefore, the information recording medium 2 and the magnetic gap of the magnetic head 5 are surely abutted with each other to eliminate a spacing loss and thus magnetic information recorded on the information recording medium 2 can be appropriately read by the magnetic head 5.

In this embodiment, the guide part which is structured of the first side face part 11f and the second inclined side face part 12c is not disposed at a position facing the magnetic gap of the magnetic head 5 and is disposed on the upstream side with respect to the magnetic gap in the front and rear direction. In other words, a mechanism for eliminating a spacing loss is not disposed at a position facing the magnetic gap. Therefore, in this embodiment, the scanner 6 can be disposed at a position facing the magnetic gap and, as a result, a degree of freedom in design can be enhanced.

Further, since the scanner 6 can be disposed at a position facing the magnetic gap, the size of the information reading device 1 can be reduced in the front and rear direction. Further, reading accuracy of image can be prevented from lowering due to variation of a passing speed of the information recording medium 2 when the tip end 2d of the information recording medium 2 begins to contact with the magnetic head 5 or, when the rear end 2c of the information recording medium 2 comes out from the magnetic head 5.

In this embodiment, the left end 12h of the upstream side end of the third inclined side face part 12d is disposed on the right side with respect to the left end 12g of the downstream side end of the second inclined side face part 12c and to the left end face of the optical transparent member 8 in the right and left direction. Therefore, the tip end 2d of the information recording medium 2 passing through the medium passage 3 can be prevented from being caught by the left end 12h of the upstream side end of the third inclined side face part 12d.

In this embodiment, the left end face of the optical transparent member 8 is disposed on the right side with respect to the left end 12g of the downstream side end of the second inclined side face part 12c in the right and left direction. Further, in this embodiment, even when a turning force is applied to the information recording medium 2 with the left end 12g of the downstream side end of the second inclined side face part 12c as a turning center before the tip end 2d of the information recording medium 2 is reached to the third inclined side face part 12d, the first side face part 11f is formed so that the information recording medium 2 is not abutted with the optical transparent member 8 or, so that even when abutted, the information recording medium 2 is abutted with the optical transparent member 8 with a small abutting force so as not to occur scratches. Therefore, the optical transparent member 8 can be prevented from being scratched due to contact of the information recording medium 2 with the optical transparent member 8.

In this embodiment, in a state that the information recording medium 2 and the magnetic head 5 are not abutted with each other, a predetermined gap space is formed between the tip end of the magnetic head 5 and the optical transparent member 8 in the right and left direction. Therefore, the optical transparent member 8 can be prevented from being scratched due to contact of the magnetic head 5 with the optical transparent member 8.

In this embodiment, a gap space which is formed between the tip end of the magnetic head 5 and the left end face of the optical transparent member 8 when an information recording medium 2 and the magnetic head 5 are not abutted with each other is set to be smaller than a sum of a minimum thickness of the information recording medium 2, which is used in the information reading device 1, and a depth of field of the scanner 6. Therefore, magnetic information can be appropriately read by surely abutting the information recording medium 2 with the magnetic gap of the magnetic head 5 and an image on the information recording medium 2 can be appropriately acquired by the scanner 6.

In this embodiment, a distance "L1" in the front and rear direction between the magnetic gap which is formed at the tip end of the magnetic head 5 and the downstream side end of the second inclined side face part 12c is set to be shorter than a distance "L2" between a rear end of a magnetic information recording area 2b on the information recording medium 2 and the rear end 2c of the information recording medium 2 in the front and rear direction. Therefore, when the rear end 2c of the information recording medium 2 is passed through the downstream side end of the second inclined side face part 12c and the rear end 2c of the information recording medium 2 comes out from the downstream side end of the second inclined side face part 12c, the rear end of the magnetic information recording area 2b has been passed through the magnetic gap. Accordingly, reading accuracy of the magnetic information can be prevented from being lowered due to variation of a passing speed of the information recording medium 2 when the rear end 2c of the information recording medium 2 comes out from the downstream side end of the second inclined side face part 12c.

In this embodiment, the magnetic head 5 and the pad roller 7 are attached to the opening/closing part 11a and, when the opening/closing part 11a is set to be in an opened state, the optical transparent member 8 of the scanner 6 is exposed. Therefore, even when the magnetic head 5 and the pad roller 7 are oppositely disposed to the scanner 6, maintenance of the scanner 6 can be performed relatively easily.

In this embodiment, the magnetic head 5 is urged by the urging mechanism 20 in a direction that the information recording medium 2 passing through the medium passage 3 and the magnetic head 5 are abutted with each other, and the pad roller 7 is urged by the plate spring 10 in a direction that the information recording medium 2 passing through the medium passage 3 and the pad roller 7 are abutted with each other and thus, the information recording medium 2 passing through the medium passage 3 is pressed toward the scanner 6 by the magnetic head 5 and the pad roller 7. Therefore, even when a width of the scanner 6 in the upper and lower direction is set to be wider than a width of the magnetic head 5 in the upper and lower direction and a width of the pad roller 7, the information recording medium 2 passing through the medium passage 3 can be passed within the depth of field of the scanner 6 in a predetermined range in the upper and lower direction. Accordingly, the image on the information recording medium 2 can be acquired appropriately by the scanner 6. Especially, in this embodiment, since the scanner 6 is a contact type scanner, the depth of field is shallow and thus, unless the information recording medium 2 passing through the medium passage 3 is appropriately pressed toward the scanner 6, the scanner 6 is difficult to appropriately acquire the image of the information recording medium 2. However, in this embodiment, the image of the information recording medium 2 can be appropriately acquired by the scanner 6.

In this embodiment, a part of the information recording medium 2 passing through the medium passage 3 is pressed toward the scanner 6 by the pad roller 7. Therefore, even when the information recording medium 2 passing through the medium passage 3 is pressed toward the scanner 6 by the pad roller 7, the information recording medium 2 can be smoothly passed through the medium passage 3.

In this embodiment, the plate spring 10 for urging the pad roller 7 is structured separately from the urging mechanism 20 which urges the magnetic head 5. Therefore, the urging mechanism 20 is not required to urge the pad roller 7. Accordingly, when the structure of the urging mechanism 20 is to be taken into consideration, followability of the magnetic head 5 to the information recording medium 2, an abutting force of the magnetic head 5 with the information recording medium 2 and the like may be required to be taken into consideration without considering the structure for urging the pad roller 7. As a result, in this embodiment, the information recording medium 2 and the magnetic gap can be surely abutted with each other by making the magnetic head 5 follow the information recording medium 2 through the urging mechanism 20. Further, when the structure of the plate spring 10 is to be taken into consideration, an abutting force of the pad roller 7 with the information recording medium 2, followability of the pad roller 7 to the information recording medium 2 and the like may be required to be taken into consideration without considering the structure for urging the magnetic head 5. Therefore, the information recording medium 2 and the pad roller 7 can be surely abutted with each other by making the pad roller 7 follow the information recording medium 2 through the plate spring 10. Accordingly, in this embodiment, the information recording medium 2 passing through the medium passage 3 can be further appropriately pressed toward the scanner 6 by the magnetic head 5 and the pad roller 7 and, as a result, an image on the information recording medium 2 can be further appropriately acquired by the scanner 6.

(Other Embodiments)

Although the present invention has been shown and described with reference to a specific embodiment, various changes and modifications will be apparent to those skilled in the art from the teachings herein.

In the embodiment described above, the upstream side of the left side face of the second side wall part 12 with respect to the scanner 6 is structured of the first side face part 12a, the first inclined side face part 12b and the second inclined side face part 12c. However, the present invention is not limited to this embodiment. For example, as shown in FIG. 10(A), a side face part 12j which is formed in a flat-like face so as to be substantially parallel to the front and rear direction may be formed instead of the second inclined side face part 12c. In this case, the information recording medium 2 is guided by the side face part 12j so that the tip end 2d of the information recording medium 2 passing through the medium passage 3 from the upstream side toward the downstream side is abutted with the inclined part 5a of the magnetic head 5. Further, in this case, the side face part 12j is the second guide part which is formed in the second side wall part 12.

Further, as shown in FIG. 10(B), the upstream side of the left side face of the second side wall part 12 with respect to the scanner 6 may be structured of a side face part 12k, which is formed in a flat-like face so as to be substantially parallel to the front and rear direction and is disposed on the upstream side, and an inclined side face part 12m which is formed in a flat-like face so as to be inclined on the left side toward the downstream side and is disposed on the downstream side. In this case, the information recording medium 2 is guided by the inclined side face part 12m so that the tip end 2d of the information recording medium 2 passing through the medium passage 3 from the upstream side toward the downstream side is abutted with the inclined part 5a of the magnetic head 5. Further, in this case, the inclined side face part 12m is the second guide part which is formed in the second side wall part 12.

In the embodiment described above, the information reading device 1 is provided with the urging mechanism 20 for urging the magnetic head 5 in a direction in which the information recording medium 2 and the magnetic head 5 are abutted with each other. However, the present invention is not limited to this embodiment. For example, the information reading device 1 may be provided with an urging mechanism for urging the second inclined side face part 12c in a direction in which the information recording medium 2 and the magnetic head 5 are abutted with each other instead of using the urging mechanism 20 or together with the urging mechanism 20. In other words, the information reading device 1 may be provided with an urging mechanism for urging the second inclined side face part 12c toward the left side. Further, the information reading device 1 may be provided with an urging mechanism for urging the second side face part 11h in a direction in which the information recording medium 2 and the magnetic head 5 are abutted with each other. In other words, the information reading device 1 may be provided with an urging mechanism for urging the second side face part 11h toward the right side.

Further, the information reading device 1 may be provided with a roller, which is disposed on the upstream side with respect to the magnetic head 5 disposed on the right side face of the first side wall part 11 and/or on the upstream side with respect to the scanner 6 disposed on the left side face of the second side wall part 12 so that the roller is abutted with an information recording medium 2 and, in addition, the information reading device 1 may be provided with an urging mechanism for urging the roller in a direction so that the information recording medium 2 and the magnetic head 5 are abutted with each other. In this case, the roller functions as a guide part for guiding the information recording medium 2 so that, when the information recording medium 2 and the magnetic head 5 are abutted with each other, mutually pressing forces are applied to the information recording medium 2 and the magnetic head 5.

In the embodiment described above, the first side face part 11f which is the first guide part is integrally formed with the first side wall part 11 and the second inclined side face part 12c which is the second guide part is integrally formed with the second side wall part 12. However, the present invention is not limited to this embodiment. For example, the first guide part may be separately formed from the first side wall part 11 and the first guide part may be attached to the first side wall part 11. Further, the second guide part may be separately formed from the second side wall part 12 and the second guide part may be attached to the second side wall part 12. In this case, for example, a second guide part which is formed of metal may be attached to the second side wall part 12. According to this structure, abrasion of the second guide part can be restrained. Further, damage of the scanner 6 due to static electricity can be prevented by discharging an information recording medium 2 charged with electricity through the second guide part which is made of metal. Therefore, in this case, the discharge electrode 22 is not required to be disposed and the structure of the information reading device 1 can be simplified. In this case, for example, the second side wall part 12 may be formed of conductive resin and a second guide part made of metal may be grounded through the second side wall part 12. Alternatively, the second guide part made of metal may be grounded through a cable.

In the embodiment described above, the tip end of the magnetic head 5 where a magnetic gap is formed is disposed on a slightly right side with respect to the left end 12g of the downstream side end of the second inclined side face part 12c in the right and left direction. However, the present invention is not limited to this embodiment. For example, the tip end of the magnetic head 5 may be disposed at a substantially same position as the left end 12g of the downstream side end of the second inclined side face part 12c in the right and left direction. Further, in a case that an information recording medium 2 is relatively thick and its rigidity is relatively high, the tip end of the magnetic head 5 may be disposed on a left side with respect to the left end 12g of the downstream side end of the second inclined side face part 12c in the right and left direction.

In the embodiment described above, the opening/closing part 11a is turned with the rear end side as a turning center to be in a closed state or an opened state with respect to the second side wall part 12. However, the present invention is not limited to this embodiment. For example, the opening/closing part 11a may be in a closed state or an opened state with respect to the second side wall part 12 by sliding in a predetermined direction or the like. Further, the opening/closing part 11a may be detachably structured with respect to the fixed part 11b. In accordance with an embodiment of the present invention, the first side wall part 11 is not provided with the opening/closing part 11a.

In the embodiment described above, in order to prevent the tip end 2d of an information recording medium 2 passing through the medium passage 3 from being caught by the left end 12h of the upstream side end of the third inclined side face part 12d, the left end 12h of the upstream side end of the third inclined side face part 12d is disposed on the right side in the right and left direction with respect to the left end 12g of the downstream side end of the second inclined side face part 12c and the left end face of the optical transparent member 8. However, the present invention is not limited to this embodiment. For example, in order to prevent the tip end 2d of an information recording medium 2 passing through the medium passage 3 from being caught by the left end 12h of the upstream side end of the third inclined side face part 12d, a left end portion of the upstream side end of the third inclined side face part 12d may be formed in a comb-like shape.

In the embodiment described above, the pad roller 7 is disposed so as to be adjacent to the magnetic head 5 as a pressing member for pressing an information recording medium 2 passing through the medium passage 3 toward the scanner 6. However, the present invention is not limited to this embodiment. For example, instead of using the pad roller 7, a block-like member such as a dummy head having a superior sliding property may be disposed so as to be adjacent to the magnetic head 5. Further, instead of using the pad roller 7, a spring member or the like for pressing an information recording medium 2 passing through the medium passage 3 toward the scanner 6 may be disposed so as to be adjacent to the magnetic head 5.

In the embodiment described above, the plate spring 10 for urging the pad roller 7 is separately provided from the urging mechanism 20. However, the present invention is not limited to this embodiment. For example, the urging mechanism 20 may be provided with a function for urging the pad roller 7 without using the plate spring 10.

In the embodiment described above, the contact type scanner 6 is disposed at a position facing the magnetic head 5. However, the present invention is not limited to this embodiment. For example, a reduction optical type scanner may be disposed at a position facing the magnetic head 5. Further, an optical type sensor such as a photo interrupter may be disposed at a position facing the magnetic head 5. Further, other various mechanisms may be disposed at a position facing the magnetic head 5. Further, a space may be provided without providing anything between the second inclined side face part 12c and the third inclined side face part 12d at a position facing the magnetic head 5 (more specifically, position facing the magnetic gap of the magnetic head 5).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An information reading device comprising:
a medium passage through which an information recording medium on which magnetic information is recorded is passed;
a magnetic head for abutting with the information recording medium which is passed through the medium passage for reading the magnetic information which is recorded on the information recording medium;
a guide part for guiding the information recording medium so as to apply a force so that, when the information recording medium and the magnetic head are abutted with each other, the information recording medium and the magnetic head are mutually pressed against each other; and
an urging mechanism for urging at least one of the magnetic head and the guide part in a direction in which the information recording medium and the magnetic head are abutted with each other;
wherein the guide part is not disposed at a position facing a magnetic gap which is formed at a tip end of the magnetic head, and the guide part is disposed on an upstream side with respect to the magnetic gap in a passing direction of the information recording medium.

2. The information reading device according to claim 1, further comprising:
a first side wall part to which the magnetic head is attached; and
a second side wall part which is oppositely disposed to the first side wall part to form the medium passage together with the first side wall part;
wherein the guide part is structured of a first guide part which is formed in or attached to the first side wall part and a second guide part which is formed in or attached to the second side wall part.

3. The information reading device according to claim 2, wherein the second guide part guides the information recording medium so that a tip end of the information recording medium in the passing direction of the information recording medium is abutted with an inclined part which is formed on a tip end side of the magnetic head.

4. The information reading device according to claim 3, wherein the second guide part is an inclined face which is inclined toward the magnetic head as going to a downstream side in the passing direction of the information recording medium.

5. The information reading device according to claim 4, wherein
the inclined face of the second guide part guides the information recording medium so that a tip end of the information recording medium is abutted with an inclined part of the magnetic head, and
when the tip end of the information recording medium is abutted with the inclined part of the magnetic head, a turning force is applied to the information recording medium by the magnetic head with a downstream side end of the inclined face of the second guide part as a turning center, and turning of the information recording medium due to the turning force is restricted by the first guide part.

6. The information reading device according to claim 5, wherein
a turning prevention part is formed on a downstream side of the second side wall part with respect to the magnetic gap in the passing direction of the information recording medium for preventing turning of the information recording medium when the information recording medium and the magnetic head are abutted with each other, and
a first side wall part side end of an upstream side end of the turning prevention part in the passing direction of the information recording medium is disposed on a second side wall part side in the facing direction of the first side wall part and the second side wall part with respect to a first side wall part side end of a downstream side end of the second guide part in the passing direction of the information recording medium.

7. The information reading device according to claim 6, wherein a distance in the passing direction of the information recording medium between a first side wall part side end of a downstream side end of the inclined face of the second guide part in the passing direction of the information recording medium and the magnetic gap is set to be shorter than a distance in the passing direction of the information recording medium between a rear end of the information recording medium in the passing direction of the information recording medium and a rear end of a magnetic information recording area on the information recording medium.

8. The information reading device according to claim 4, wherein, in a direction perpendicular to the medium passage, the tip end of the magnetic head overlaps with a downstream edge of the second guide part.

9. The information reading device according to claim 8, wherein
a turning prevention part is formed on a downstream side of the second side wall part with respect to the magnetic gap in the passing direction of the information recording medium for preventing turning of the information recording medium when the information recording medium and the magnetic head are abutted with each other, and
a first side wall part side end of an upstream side end of the turning prevention part in the passing direction of the information recording medium is disposed on a second side wall part side in the facing direction of the first side wall part and the second side wall part with respect to a first side wall part side end of a downstream side end of the second guide part in the passing direction of the information recording medium.

10. The information reading device according to claim 8, wherein a distance in the passing direction of the information recording medium between a first side wall part side end of a downstream side end of the second guide part in the passing direction of the information recording medium and the magnetic gap is set to be shorter than a distance in the passing direction of the information recording medium between a rear end of the information recording medium in the passing direction of the information recording medium and a rear end of a magnetic information recording area on the information recording medium.

11. The information reading device according to claim 8, wherein the urging mechanism holds the magnetic head and urges the magnetic head to the information recording medium.

12. The information reading device according to claim 2, wherein, in a direction perpendicular to the medium passage, the tip end of the magnetic head overlaps with a downstream edge of the second guide part.

13. The information reading device according to claim 12, wherein the urging mechanism urges the magnetic head and holds the magnetic head so as to be capable of swinging the magnetic head with the passing direction of the information recording medium as an axial direction and/or capable of swinging the magnetic head with a thickness direction of the information recording medium as an axial direction.

14. The information reading device according to claim 2, wherein a turning prevention part is formed on a downstream side of the second side wall part with respect to the magnetic gap in the passing direction of the information recording medium for preventing turning of the information recording medium with a direction perpendicular to the passing direction of the information recording medium and a thickness direction of the information recording medium as an axial direction when the information recording medium and the magnetic head are abutted with each other.

15. The information reading device according to claim 14, wherein a first side wall part side end of an upstream side end of the turning prevention part in the passing direction of the information recording medium is disposed on a second side wall part side in the facing direction of the first side wall part and the second side wall part with respect to a first side wall part side end of a downstream side end of the second guide part in the passing direction of the information recording medium.

16. The information reading device according to claim 2, further comprising an image reading part having an optical transparent member which is disposed to face the medium passage, and the image reading part reads a surface of the information recording medium to acquire an image on the information recording medium, wherein the image reading part is attached to the second side wall part so as to be oppositely disposed to the magnetic head in a facing direction of the first side wall part and the second side wall part.

17. The information reading device according to claim 16, wherein, in a direction perpendicular to the medium passage, a downstream edge of the second guide part projects further into the medium passage than an end face of the optical transparent member closest to the medium passage.

18. The information reading device according to claim 17, wherein in a state that the information recording medium and the magnetic head are not abutted with each other, a predetermined gap space is formed between the tip end of the magnetic head and the optical transparent member in the facing direction of the first side wall part and the second side wall part.

19. The information reading device according to claim 18, wherein the predetermined gap space between the tip end of the magnetic head and the optical transparent member in the facing direction of the first side wall part and the second side wall part is smaller than a sum of a minimum thickness of the information recording medium which is used in the information reading device and a depth of field of the image reading part.

20. The information reading device according to claim 16, wherein the first side wall part is provided with an opening/closing part which is capable of opening or closing with respect to the second side wall part, and the magnetic head is attached to the opening/closing part.

21. The information reading device according to claim 20, wherein the second guide part is formed of metal.

22. The information reading device according to claim 16, further comprising a pressing member which is oppositely disposed to the image reading part in the facing direction of the first side wall part and the second side wall part, the pressing member being attached to the first side wall part so as to be adjacent to the magnetic head in a direction substantially perpendicular to the facing direction of the first side wall part and the second side wall part and the passing direction of the information recording medium, and the pressing member pressing the information recording medium which is passed through the medium passage toward the image reading part, wherein the urging mechanism urges the magnetic head.

23. The information reading device according to claim 22, wherein the image reading part is a contact type scanner.

24. The information reading device according to claim 22, wherein the pressing member is a pad roller which is capable of abutting with the information recording medium which is passed through the medium passage and is capable of rotating with a direction substantially perpendicular to the facing direction of the first side wall part and the second side wall part and the passing direction of the information recording medium as an axial direction.

25. The information reading device according to claim 24, further comprising an urging member, which is separately provided from the urging mechanism, for urging the pressing member toward the information recording medium which is passed through the medium passage.

26. The information reading device according to claim 25, wherein
   the second guide part is an inclined face which is inclined toward the magnetic head as going to a downstream side in the passing direction of the information recording medium so that a tip end of the information recording medium in the passing direction of the information recording medium is abutted with an inclined part which is formed on a tip end side of the magnetic head,
   the inclined face of the second guide part guides the information recording medium so that the tip end of the information recording medium is abutted with the inclined part of the magnetic head, and
   when the tip end of the information recording medium is abutted with the inclined part of the magnetic head, a turning force is applied to the information recording medium by the magnetic head with a downstream side end of the inclined face of the second guide part as a turning center, and turning of the information recording medium due to the turning force is restricted by the first guide part.

27. The information reading device according to claim 26, wherein
   a turning prevention part is formed on a downstream side of the second side wall part with respect to the magnetic gap in the passing direction of the information recording medium for preventing turning of the information recording medium when the information recording medium and the magnetic head are abutted with each other, and
   a first side wall part side end of an upstream side end of the turning prevention part in the passing direction of the information recording medium is disposed on a second side wall part side in the facing direction of the first side wall part and the second side wall part with respect to a first side wall part side end of a downstream side end of the second guide part in the passing direction of the information recording medium.

28. The information reading device according to claim 27, wherein a distance in the passing direction of the information recording medium between a first side wall part side end of a downstream side end of the second guide part in the passing direction of the information recording medium and the magnetic gap is set to be shorter than a distance in the passing direction of the information recording medium between a rear end of the information recording medium in the passing direction of the information recording medium and a rear end of a magnetic information recording area on the information recording medium.

29. The information reading device according to claim 26, wherein, in a direction perpendicular to the medium passage, the tip end of the magnetic head overlaps with a downstream edge of the second guide part.

30. The information reading device according to claim 24, wherein the first side wall part is provided with an opening/closing part which is capable of opening or closing with respect to the second side wall part, and the magnetic head and the pressing member are attached to the opening/closing part.

31. The information reading device according to claim 2, wherein a turning prevention part is formed on a downstream side of the second side wall part with respect to the magnetic gap in the passing direction of the information recording medium for preventing turning of the information recording medium with a direction perpendicular to the passing direction of the information recording medium and a thickness direction of the information recording medium as an axial direction when the information recording medium and the magnetic head are abutted with each other.

32. The information reading device according to claim 31, wherein a first side wall part side end of an upstream side end of the turning prevention part in the passing direction of the information recording medium is disposed on a second side wall part side in the facing direction of the first side wall part and the second side wall part with respect to a first side wall part side end of a downstream side end of the second guide part in the passing direction of the information recording medium.

33. The information reading device according to claim 2, wherein a distance in the passing direction of the information recording medium between a first side wall part side end of a downstream side end of the second guide part in the passing direction of the information recording medium and the magnetic gap is set to be shorter than a distance in the passing direction of the information recording medium between a rear end of the information recording medium in the passing direction of the information recording medium and a rear end of a magnetic information recording area on the information recording medium.

* * * * *